United States Patent [19]

Sawano et al.

[11] Patent Number: 4,860,273
[45] Date of Patent: Aug. 22, 1989

[54] METHOD OF RECORDING INFORMATION AND INFORMATION RECORDING MEDIUM EMPLOYED FOR THE SAME

[75] Inventors: Mitsuru Sawano; Masao Yabe, both of Fujinomiya, Japan

[73] Assignee: Fuji Photo Film Co., Ltd., Minami-Ashigara, Japan

[21] Appl. No.: 80,542

[22] Filed: Jul. 31, 1987

[30] Foreign Application Priority Data

Jul. 31, 1986 [JP] Japan .............................. 61-181442
Jul. 31, 1986 [JP] Japan .............................. 61-18443

[51] Int. Cl.⁴ ........................... G11B 7/24; G11B 7/26
[52] U.S. Cl. .................................... 369/100; 369/275
[58] Field of Search ............... 369/100, 111, 275, 284; 346/76 L, 135

[56] References Cited

U.S. PATENT DOCUMENTS

| | | | |
|---|---|---|---|
| 3,971,874 | 7/1976 | Ohta et al. | 369/100 |
| 4,069,487 | 1/1978 | Kasai et al. | 346/76 L |
| 4,325,135 | 4/1982 | Dil et al. | 369/275 |
| 4,443,870 | 4/1984 | Hazel et al. | 369/275 |
| 4,465,767 | 8/1984 | Oba et al. | 346/76 L |
| 4,519,064 | 5/1985 | Takagi et al. | 369/111 |
| 4,722,595 | 2/1988 | Siol | 369/100 |
| 4,757,492 | 7/1988 | Fukushima et al. | 369/100 |

*Primary Examiner*—Donald McElheny, Jr.
*Attorney, Agent, or Firm*—Gerald J. Ferguson, Jr.

[57] ABSTRACT

A method of recording information comprising the steps of: irradiating a light-absorbing material (which is arranged in contact with a polymer blend which changes in its phase condition between a homogeneous state and a phase-separated state in response to change of its temperature across its cloud point) with a laser beam for causing the light-absorbing material to absorb energy of the beam and generate a heat, whereby elevating the temperature of the polymer blend near the light-absorbing material to a temperature of above the cloud point to change the phase condition of the polymer blend into a state which is different from the original state before the elevation of the temperature; and rapidly cooling the polymer blend to fix the polymer blend in its changed phase condition. An information recording medium preferably employed for the method is also disclosed.

19 Claims, 4 Drawing Sheets

METHOD OF RECORDING INFORMATION AND INFORMATION RECORDING MEDIUM EMPLOYED FOR THE SAME

BACKGROUND OF THE INVENTION

1. Field of the Invention

The present invention relates to a novel method of recording information by the use of a laser beam of highenergy density and an novel information recording medium advantageously employed for the recording method. More particularly, the invention relates to a method of recording information based on change of phase condition (i.e., phase change) and an information recording medium capable of recording and erasing information on the basis of the phase change.

2. Description of Prior Art

Information recording media utilizing a beam of high energy density such as laser beam have been developed in recent years and are put to practical use. Such recording medium is called an optical disc and its practical applications have been found, for example, as video disc and audio disc as well as disc memory for large-capacity computer and large-capacity static image file.

The optical disc basically comprises a disc-shaped transparent substrate of a plastic or glass material and a recording layer provided on the substrate. As a material of the recording layer, there are known a metal such as Bi, Sn, In or Te, a semi-metal, and a dye such as cyanine dye, metal complex dye or quinoline dye. Writing of information on the optical disc can be conducted, for example, by irradiating the optical disc with laser beam. Under irradiation with the laser beam, the irradiated area of the recording layer of the optical disc absorbs energy of the beam and a rise in temperature locally occurs, and as a result a chemical or physical change is caused to alter (or change) optical characteristics of the recording layer in the irradiated area, whereby the recording of information can be made.

The optical characteristics of the recording layer is altered, for example, by forming pits or protruded portions on the surface of the recording layer or forming bubbles in the recording layer, and the recording of information utilizing the formation of pits is widely employed. Otherwise, a method of utilizing a reaction between two recording layers, a method of utilizing a phase change and a method of utilizing magnetic inversion are also known for recording information. As the method of utilizing a phase change, there is known a process comprising elevating a temperature of a non-crystalline recording layer of As-Te-Ge type to higher than a glass transition point to cyrstallize the layer so as to perform recording of information.

Reading of information from the optical disc is also conducted by irradiating the optical disc with laser beam. The information can be reproduced by detecting reflected light or transmitted light corresponding to the change in the optical characteristics of the recording layer.

The optical disc includes two types, that is, one capable of recording (or writing) information only once (i.e., read only type) and the other capable of recording and erasing information repeatedly (i.e., erasable type).

Erasure of information from the optical disc can be done only in the case that recording of information is attained through reversible change of the recording layer. Accordingly, an optical disc which records information through change of shape (i.e., physical structure) of the recording layer such as formation of pits, etc. is of a read only type.

As a material of the recording layer, an inorganic material (e.g., a metal or a semi-metal) and a dye are heretofore used as described before, and any organic polymer material which is excellent in various properties such as workability, safety and cost had not been proposed up to recently. Recently, however, there is proposed an information recording method comprising using a polymer blend composed of a vinylidene fluoride polymer and polymethyl methacrylate as a material of the recording layer and utilizing change of phase condition of the polymer blend between a homogeneous state (i.e., state of solution) and a phase-separated state, as described by Miyata, et al. in "Optical Recording Material Using Polymer Blend" in the Collected Papers for The First High Science-Technology Exhibition, P. 31 (1986) published by Tokyo Agricultural and Technological Univ., 1986. However, it is practically impossible to record sufficient amount of information by using only the polymer blend because the polymer blend itself has a low absorption for a light such as a laser beam. Hence, the polymer blend appears to be hardly put into practical use.

SUMMARY OF THE INVENTION

It is an object of the present invention to provide a novel method of recording information using an organic polymer material as a recording material and a novel information recording medium employed for the method.

There is provided by the present invention a method of recording information comprising the steps of:

irradiating a light-absorbing material with a laser beam for causing said light-absorbing material to absorb energy of the beam and generate a heat, said light-absorbing material being arranged in contact with a polymer blend which changes in its phase condition between a homogeneous state and a phase-separated state in response to change of its temperature across its cloud point, whereby elevating the temperature of said polymer blend in the vicinity of said light-absorbing material to a temperature of not lower than the cloud point of the polymer blend to change its phase condition into a state which is different from the original state before the elevation of the temperature; and rapidly cooling the polymer blend to fix the polymer blend in its changed phase condition.

The recording method of the invention can be advantageously performed by using an information recording medium comprising a substrate and a recording layer provided on one surface or both surfaces of the substrate which contains the above-mentioned polymer blend and a light-absorbing material.

The recording method of the invention can be also advantageously performed by using an information recording medium comprising a substrate, a recording layer which is provided on one surface or both surfaces of the substrate and comprises the above-mentioned polymer blend, and a light-absorbing layer which is arranged in contact with the recording layer and comprises a light-absorbing material.

The information which has been recorded on the medium according to the above-described method can be erased for the next recording of other information. Erasure of the recorded information can be easily carried out by the process comprising the steps of uniformly irradiating the above-mentioned polymer blend with a light for causing the light-absorbing material to generate a heat, elevating a temperature of the polymer blend to a temperature of not lower than its cloud point between the homogeneous state and the phase-separated state, and then gradually cooling the polymer blend. By this process, the polymer blend can be returned to its original state (i.e., un-recorded state). The polymer blend can be also returned to its original state (i.e., un-recorded state) by directly heating the polymer blend at a temperature of not lower than the cloud point and then gradually cooling the polymer blend. Further, the recorded information can be partially rewritten with ease by the following process. The light-absorbing material which is in contact with the aimed portion of the polymer blend is irradiated with a laser beam. Under irradiation with the laser beam, the light-absorbing material absorbs energy of the beam to generate a heat. By the generated heat, a temperature of the aimed portion of the polymer blend is elevated to a temperature of above the cloud point of the polymer blend so as to change or alter the phase condition of the polymer blend, and the polymer blend is then gradually cooled. Thus, the recorded information can be partially rewritten.

In the invention, the term "cloud point" means a temperature at which the composition of the polymer blend gives a change or an alteration of phase condition (i.e., phase change) between a homogeneous state and a phase-separated state. In general, the change of the phase condition is apparently observed as a change from a transparent state (i.e., homogeneous state) to an opaque state (or a translucent state).

The polymer blends employable in the invention can be a polymer blend of a lower critical solution temperature (LCST) type and a polymer blend of an upper critical solution temperature (UCST) type. The polymer blend of LCST type shows a phase-separated state at a temperature of not lower than the cloud point, while the polymer blend of UCST type shows a homogeneous state at a temperature of not lower than the cloud point. Any of those polymer blends gives a change of phase condition between the homogeneous state and the phase-separated state in accordance with variation of temperature across the cloud point. In more detail, any of those polymer blends is transparent in the homogeneous state because the polymer components are homogeneously mixed with each other, while it is opaque in the phase-separated state because the phase-separated polymer components differ from each other in the refractive index. Further, the polymer blend has such characteristics that the polymer blend which has temporarily turned opaque or transparent at a temperature of not lower than the cloud point returns to its original (starting) state when gradually cooled, but keeps the opaque or transparent state even at room temperature after it is cooled rapidly for fixing.

In the method of the invention, a polymer blend which serves a recording material is brought into contact with a light-absorbing material, and the light-absorbing material is irradiated with a laser beam. Under irradiation with the beam, the light-absorbing material absorbs energy of the beam and generates a heat. Upon Receipt of the heat, the polymer blend increases in its temperature to a temperature of above its cloud point to change in the phase condition, whereby the polymer blend turns opaque or transparent. Thereafter, the polymer blend is rapidly cooled to fix the irradiated area of the polymer blend in the opaque or transparent state. Thus, recording of information is performed. Reproduction of the recorded information can be done by a conventional process of irradiating with a laser beam of relatively low level. In more detail, the recorded information can be read out based on the difference of reflectance or transmittance based on the difference of transparency.

Moreover, the polymer blend which has been partially changed in the phase condition can be returned to its original state in the irradiated area (recorded area) by the process of again elevating a temperature of the polymer blend to a temperature of above the cloud point and then gradually cooling. By this operation, the whole polymer blend returns to its original transparent or opaque state, and the recorded information is erased. Partial erasure of the recorded information can be also performed by subjecting the aimed area of the polymer blend to the same erasing operation as described above.

Accordingly, the information recording medium of the present invention comprising a recording layer containing the above-described polymer blend and light-absorbing material is very useful as a recording medium of E-DRAW (Erasable-Direct Read After Write) type in which information can be recorded and erased at any time.

The present invention can be effectively applied to recording media of various forms, for example, optical discs such as a video tape, an audio tape, a flexible disc and a disc memory for large-capacity computer or large-capacity static image file, as well as optical recording media of other forms such as card, sheet and tape.

The recording layer of the recording medium according to the present invention can be easily formed by a coating method, because the recording material employed is a polymer. Accordingly, the process for the preparation of the recording medium can be simplified, the time required for the preparation of the medium can be very shortened, and the manufacturing cost can be reduced.

DETAILED DESCRIPTION OF THE INVENTION

The information recording medium of the invention is now described by referring to the attached drawings.

Each of FIGS. 1 to 6 is a sectional view showing an example of the constitution of the information recording medium of the present invention.

Figure 1:
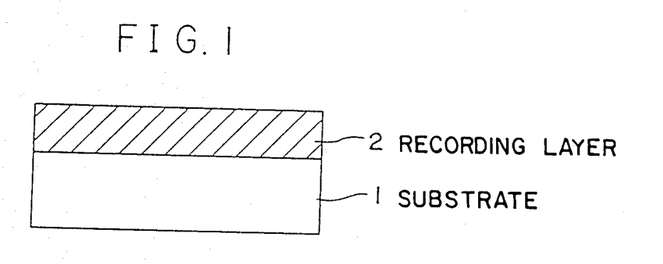
FIGS. 1 to 6 are sectional views showing examples of the constitution of an information recording medium according to the present invention.

In FIG. 1, the recording medium comprises a substrate 1 and a recording layer 2 provided on one surface of the substrate 1. The recording layer 2 comprises, as essential components, a polymer blend and a light-absorbing material.

Figure 2:
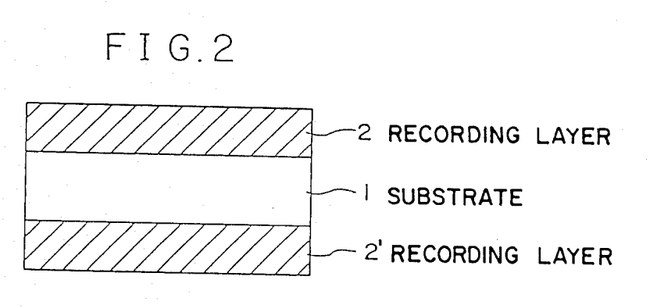

In FIG. 2, the recording medium comprises a substrate 1 and recording layers 2, 2' provided on both surfaces of the substrate.

The information recording medium of the invention may have a reflecting layer and/or a protective layer. For example, in FIG. 3, the recording medium comprises a substrate 1, a recording layer 2, a reflecting layer 3 and a protective layer 4, superposed in this order.

Figure 4:
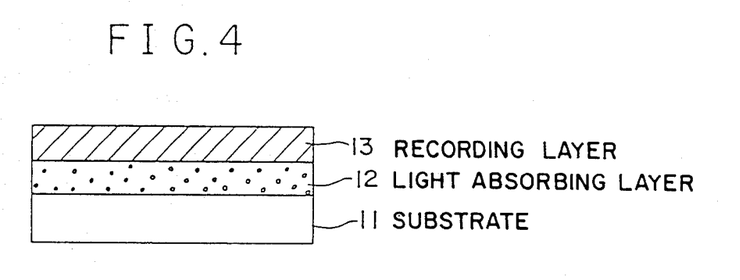

In FIG. 4, the recording medium comprises a substrate 11, a light-absorbing layer 12 and a recording layer 13, in which the latter two layers are provided on one surface of the substrate 11. The recording layer 13 comprises, as an essential component, a polymer blend.

Figure 5:
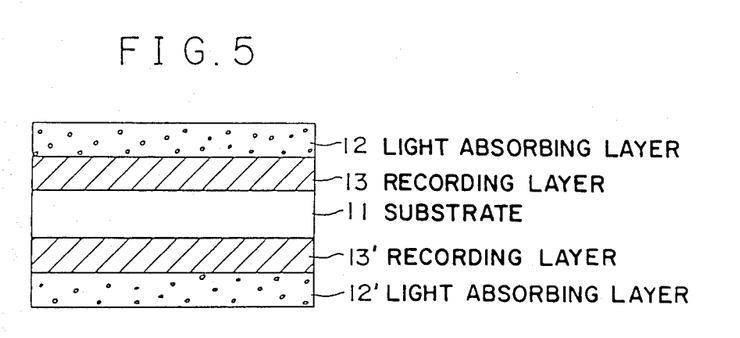

In FIG. 5, the recording medium comprises a substrate 11, light-absorbing layers 12, 12' and recording layers 13, 13', in which the latter two sets of layers are provided on both surfaces of the substrate 11.

Figure 6:
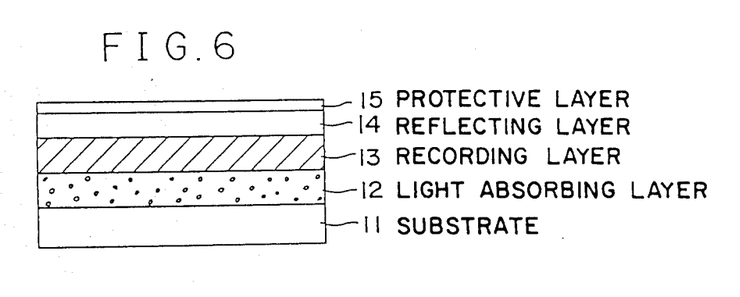

In FIG. 6, the recording medium comprises a substrate 11, a light-absorbing layer 12, a recording layer 13, a reflecting layer 14 and a protective layer 15, superposed in this order.

It should be understood that the above-described embodiments by no means restrict the constitution of the information recording medium of the invention. For example, the reflecting layer is provided between the recording layer (or light-absorbing layer) and the substrate in the case that a laser beam is irradiated from the opposite side of the substrate to perform recording or reproducing of information. Further, a variety of known intermediate layers such as an undercoating layer or a pre-groove layer may be provided between the substrate and the recording layer (or light-absorbing layer).

The information recording medium of the invention can be prepared, for example, by the following process.

In one embodiment, the recording layer essentially comprises a polymer blend and a light-absorbing material dispersed in the polymer blend. In another embodiment, the recording layer essentially comprises a polymer blend and a light-absorbing material is arranged in an independent layer which is arranged in contact with the recording layer.

The polymer blend employable as a recording material in the invention is a mixture of two or more polymers, and capable of bringing about change or alteration of phase condition (i.e., phase change or phase alteration) between the solution state and the phase-separated state. However, there are some cases where the same phase change is brought about even in a combination of a polymer and a monomer, and such combination is included in the polymer blend employable in the invention.

The polymer blend is divided into two types, that is, a polymer blend of lower critical solution temperature (LCST) type and a polymer blend of upper critical solution temperature (UCST) type. The LCST type polymer blend is transparent and in the homogeneous state at room temperature but is phase-separated at a temperature of above the cloud point to turn opaque, while the UCST type polymer blend is opaque and in the phase-separated state at room temperature but is converted in the homogeneous state at a temperature of above the cloud point to turn transparent.

Figure 7:
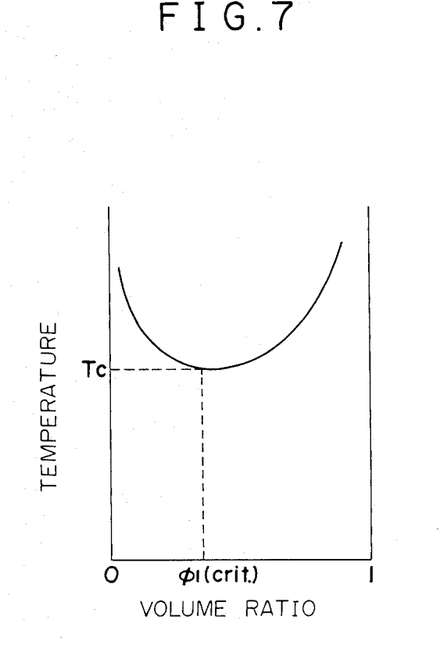
FIG. 7 is a graph showing phase condition of a LCST type polymer blend.

FIG. 7 is a graph showing an example of phase condition of the LCST type polymer blend, in which a volume fraction (i.e., volume ratio) with respect to one polymer of the employed two polymers is plotted on the abscissa and a temperature is plotted on the ordinate.

In FIG. 7, each point on the curve is a cloud point of the polymer composition. The region of lower temperature than the cloud point (i.e., region below the curve in FIG. 7) shows the homogeneous solution state (transparent), and the region of higher temperature than the cloud point (i.e., region above the curve in FIG. 7) shows the phase-separated state (opaque). The polymer blend is homogeneously mixed at a lower temperature than the lowest cloud point (Tc) regardless that the polymer blend has any composition. From this viewpoint, the temperature Tc is called a lower critical solution temperature.

On the contrary, the UCST type polymer blend shows a convex curve in its graph of phase condition, and the upper critical solution temperature is determined in the same manner.

The cloud point of the polymer blend varies depending on nature of the employed polymers, composition thereof, and further a molecular-weight distribution thereof and a molecular weight thereof in the case of an amorphous polymer. The cloud point of the polymer blend preferably is in the range of 60° to 400° C., more preferably in the range of 80° to 300° C.

Examples of the LCST type polymer blend are as follows:

(1) combination of amorphous polymers such as polystyrene and polyvinylmethyl ether, styrene/acrylonitrile copolymer and poly-$\epsilon$-caprolactone, styrene/acrylonitrile copolymer and polymethyl methacrylate, polyvinyl nitrate and polymethyl methacrylate, ethylene/vinyl acetate copolymer and chlorinated rubber, poly-$\epsilon$-caprolactone and polycarbonate (bisphenol A type), p-chlorostyrene/ochlorostyrene copolymer and poly(2,6-dimethyl-1,4-phenyleneoxide), polycarbonate (bisphenol A type) and ethylene oxide block copolymer, butylene terephthalate/tetrahydrofuran block copolymer and polyvinyl chloride, and thermoplastic polyurethane[poly-$\epsilon$-caprolactone soft block] and polyvinyl chloride;

(2) combination of a crystalline polymer and an amorphous polymer such as polyvinylidene fluoride and polymethyl acrylate, polyvinylidene fluoride and polyethyl acrylate, polyvinylidene fluoride and polymehtyl methacrylate, polyvinylidene fluoride and polyethyl methacrylate, and polyvinylidene fluoride and polyvinyl methyl ketone; and (3) combination of a crystalline polymer and a crystalline monomer such as polyethylene oxide and trioxane, and poly-$\epsilon$-caprolactone and trioxane.

Examples of the UCST type polymer blend include a combination of amorphous polymers such as a combination of polystyrene and polyisoprene, a combination of polystyrene and polyisobutene, a combination of polypropylene oxide and polybutadiene, and a combination of polyisobutene and polydimethyl siloxane.

The above-described polymers can be appropriately copolymerized with other monomers to prepare copolymers, provided that the resulting copolymers is of LCST or UCST.

The light-absorbing material employable in the invention has a high absorption for a laser beam and generates a heat by the light-absorption.

A semiconductor laser giving near infrared rays has been put into practical use as a laser for recording and reproducing information, so that preferably employed as the light-absorbing material is a dye showing a high absorption ability for the light in the near infrared region of 700–900 nm.

Examples of such dyes are given below.

(i) Cyanine dye:

(1)

(2)

in which n is 2 or 3.

(3)

in which R is hydrogen or N(CH$_3$)$_2$.

(4)

in which R is an alkyl group; and X is a hologen atom.

(5)

in which R is any one of a substituted or unsubstituted alkyl group, an alkoxy group, an aralkyl group and an alkenyl group; X is hydrogen or a halogen atom; $Y^-$ is any one of halogen, perchlorate, substituted or unsubstituted benzene sulfonate, p-toluene sulfonate, methylsulfonate, ethylsufonate, benzene carboxylate, methylcarboxylate and trifluoromethyl carboxylate; and n is an integer of 0 to 3.

(6)

in which each of Φ and Ψ is an indole ring residue or a benzoindole ring residue; L is a connecting group for forming monocarbocyanine, dicarbocyanine, tricarbocyanine or tetracarbocyanine; $X^-$ is an anionic ion; and m is 0 or 1.

(ii) Squaililium dye:

(7)

(iii) Tiol nickel complex salt dye:

(8)

(9)

in which X is hydrogen, a chlorine atom, a bromine atom or a methyl group; n is an integrer of 1 to 4; and A is a quaternary ammonium group.

(iv) Naphthoquinone dye, Anthraquinone dye:

(10)

in which R is hydrogen or OC$_2$H$_5$.

(11)

in which R is OH, NH$_2$, NHX or NX$_2$ (X is an alkyl group, and X' is the hydrogen, an alkyl group, an allyl group, an amino group or a substituted amino group); and R' is OH, NH$_2$, NHX, NX$_2$ or (X and X' have the same meanings as defined above).

(12)

There can be employed other dyes such as a triallyl methane dye, a phthalocyanine dye, an inmonium dye and a nitoso compound than the above-mentioned dyes.

In the case that the recording layer comprises the polymerblend and the light-absorbing material, the recording layer can be formed by the process comprising the steps of dissolving the polymer blend and the light-absorbing material in an appropriate solvent to prepare a coating solution, applying the coating solution over the surface of the substrate, and drying the coated layer.

Examples of the solvent employable for the preparation of the coating solution include polymer blends such as toluene, xylene, ethyl acetate, butyl acetate, Cellosolve acetate, methyl ethyl ketone, dichloromethane, 1,2-dichloroethane, dimethylformamide, methylisobutyl ketone, cyclohexanone, tetrahydrofuran, ethyl ether, dioxane, ethanol, n-propanol, isopropanol and n-buthanol; solvents capable of dissolving or dispersing the polymer blend and the light-absorbing material; and mixtures thereof.

The coating solution may further contain other additives such as an antioxidant, an UV absorbent, a plasticizer and a lubricant according to the purpose.

The coating procedure can be carried out by a conventional method such as spray coating, spin coating, dip coating, roll coating, blade coating, doctor roll coating and screen printing.

The ratio between the polymer blend and the light-absorbing material in the coating solution varies depending on nature of the employed polymer blend and light-absorbing material. The ratio therebetween is generally in the range of 100:0.1 to 100:100 (polymer blend:light-absorbing material, by weight), preferably in the range of 100:1 to 100:50. The recording layer can be composed of a single layer or plural layers. The thickness of the recording layer is generally in the range of 0.01 to 10 $\mu$m, preferably 0.02 to 1 $\mu$m, from the viewpoint of optical density required for the optical recording. The recording layer can be provided on both surfaces of the substrate (see: FIG. 2), as described hereinbefore.

The substrate material employed in the invention can be selected from any materials which have been employed as the substrates of the conventional recording media. From the viewpoint of optical characteristics, smoothness, workability, handling properties, long-term stability and manufacturing cost, preferred examples of the substrate material include glass such as tempered glass, acrylic resins such as cell-cast polymethyl methacrylate and injection-molded polymethyl methacrylate; vinyl chloride resins such as polyvinyl chloride and vinyl chloride copolymer; epoxy resins; polycarbonate resins; amorphous polyolefin; and polyesters. Preferred are polymethyl methacrylate, polycarbonate resins, epoxy resins amorphous polyolefin, polyesters and glass from the viewpoints of dimensional stability, transparency, and plainness. These materials can be employed in the form of a flexible film or a rigid sheet.

The surface of the substrate on which a recording layer is arranged may be provided with an undercoating layer for the purpose of improving smoothness, adhesion to the recording layer and sensitivity by heat insulating and preventing the recording layer from being denatured. Examples of materials for such undercoating layer include polymer materials such as polymethyl methacrylate, acrylic acid/methacrylic acid copolymer, styrene/maleic anhydride copolymer, polyvinyl alcohol, N-methylolacrylamide, styrene/sulfonic acid copolymer, styrene/vinyltoluene copolymer, chlorosulfonated polyethylene, nitrocellulose, polyvinyl chloride, chlorinated polyolefin, polyesters, polyimides, vinyl acetate/vinyl chloride copolymer, ethylene/vinyl acetate copolymer, polyethylene, polypropylene and polycarbonate; organic materials such as silane-coupling agents; and inorganic materials such as inorganic oxides (e.g., $SiO_2$, $Al_2O_3$), and inorganic fluorides (e.g., $MgF_2$).

In the case using a glass plate as the substrate, an undercoating layer for keeping the recording layer from alkali metal ions and alkalline earth metal ions (which are leberated from the glass plate) is preferably provided on the substrate. Such undercoating layer can be made of a polymer having a hydrophilic group and/or maleic anhydride group in the molecular structure, such as styrene/maleic anhydride copolymer.

The undercoating layer can be formed by dissolving or dispersing the material of the layer in an appropriate solvent and coating the solution or dispersion on a substrate through a known coating method such as spin coating, dip coating, or extrusion coating. The thickness of the undercoating layer is generally in the range of 0.005 to 20 $\mu$m, preferably in the range of 0.01 to 10 $\mu$m.

On the substrate (or the undercoating layer) may be provided a pre-groove layer for the purpose of forming tracking pre-grooves or protruded and depressed portions indicating information such as address signals. The pre-groove layer can be made of a monomer such as a monoester, diester, triester or tetraester of acrylic acid, or its oligomer in combination with a photopolymerization initiator.

The pre-groove layer can be formed on the substrate, for instance, by the following process. A mixture liquid of the above-mentioned acrylic acid ester and photopolymerization initiator is coated over a stamper (precisely prepared mother plate). On the coated layer of the mixture liquid is placed the substrate, and the layer is irradiated with an ultraviolet rays through the stamper or the substrate to harden the liquid phase of the layer, whereby the liquid phase is firmly fixed to the substrate. Then the substrate is separated from the stamper to obtain a substrate having a pre-groove layer. The pre-groove layer generally has a thickness of 0.05 to 100 $\mu$m, preferably 0.1 to 50 $\mu$m. In the case of using a plastic material as the substrate, the pre-groove can be formed directly on the substrate by a molding process such as injection molding or extrusion molding.

A reflecting layer may be provided on the recording layer for the purpose of increasing S/N ratio in the reproduction procedure and enhancing sensitivity in the recording procedure. In this case, recording of information or reproduction of recorded information is carried out by irradiating the recording layer with a laser beam from the substrate side. The reflecting layer is not always provided on the recording layer, and can be provided between the substrate (or undercoating layer) and the recording layer. In this case, recording of information or reproduction of recorded information is carried out by irradiating the recording layer with a laser beam from the upper side of the medium (i.e., opposite side of the substrate side.

The reflecting layer is essentially composed of a light-reflecting material. The light-reflecting material has a high reflectance for the laser beam. Examples of the light-reflecting material include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, and semimetals. Preferred are Al, Cr and Ni. These materials can be employed singly or in combination. Alloys thereof can be also employed in the invention.

The reflecting layer can be formed on any layer of the recording layer, substrate or the undercoating layer using the light-reflecting material according to a known method such as deposition, spattering or ion plating. The thickness of the reflecting layer is generally in the range of 100 to 3,000 angstroms.

In the case of providing the recording layer on only one surface of the substrate and performing recording and reproduction of information from the substrate side, the reflecting layer may be provided on the surface of the recording layer not facing the substrate.

A protective layer may be further provided on the surface of the recording layer or the reflecting layer not facing the substrate (i.e., exposed surface side) to physically or chemically protect the recording layer. The protective layer can be also provided on the surface of the substrate where the recording layer is not provided to enhance a resistance to damage or humidity. As a material of the protective layer, there can be mentioned inorganic materials such as SiO, $SiO_2$, $MgF_2$ and $SnO_2$; and organic materials such as thermoplastic resins, thermosetting resins and UV-curable resins.

The protective layer can be formed on the recording layer (or the reflecting layer) and/or the substrate by laminating a plastic film having been prepared by extrusion processing on any of those layers and/or the substrate by way of an adhesive layer. Otherwise, a method of vacuum deposition, spattering or coating can be also applied to form the protective layer. In the case of using the thermoplastic resin or the thermosetting resin, the resin is dissolved in an appropriate solvent to prepare a coating solution, and the solution is coated over the recording layer and/or the substrate. The coated layer is then dried to form a protective layer. In the case of using the UV-curable resin, a solution of the resin in an appropriate solvent is coated over the recording layer and/or the substrate, and the coated layer of the solution is irradiated with ultraviolet rays to cure the layer so as to form a protective layer. In any case, the coating solution may further contain a variety of additives such as an antistatic agent, an antioxidant and an UV-absorbent according to the purpose. The thickness of the protective layer is generally in the range of 0.1 to 100 μm.

As described hereinbefore, the polymer blend and the light-absorbing material can be incorporated into different layers. For instance, a recording layer comprising the recording material and a light-absorbing layer comprising the light-absorbing material can be arranged independently and in contact with each other.

In this case, the light-absorbing material can be one of the dyes described hereinbefore. Alternatively, the light-absorbing material can be a metal or semimetal exemplified for the material of the light-reflecting layer.

There is no specific limitation with respect to the arrangement of the recording layer and the light-absorbing layer, so long as both are arranged in contact with each other. The formation of these layers can be performed in manners similar to the formation of the recording layer comprising both the polymer blend and the light-absorbing material.

The thickness of the light-absorbing layer is generally in the range of 100 to 3,000 angstroms, preferably in the range of 300 to 1,000 angstroms.

Processes of recording information and erasing information according to the invention are described hereinafter referring to the information recording medium comprising a substrate and a recording layer which is shown in FIG. 1.

Recording of information is carried out in the following manner. A semiconductor laser giving near infrared rays such as Ga-As laser is employed. A laser beam converged by a known method is irradiated on the substrate side (or the recording layer side) of the information recording medium. Under irradiation, the light-absorbing material (e.g., near infrared rays-absorbing material) in the irradiated area of the recording layer instantaneously absorbs the beam energy to generate a heat. Owing to the generated heat, the polymer blend which is in contact with the light-absorbing material in the recording layer is heated to have a temperature of above its cloud point, whereby the phase condition of the polymer blend is changed. For example, the LCST type polymer blend having been transparent and in the homogeneous state is phase-separated to turn opaque by the elevation of a temperature. The recording medium is then rapidly cooled, and the polymer blend is kept in the opaque state even at room temperature. Thus, only the irradiated area of the recording layer turns opaque, and the information is recorded accordingly. In the case of the UCST type polymer blend, only the irradiated area of the recording layer is kept in the transparent homogeneous state.

Reproduction of the recorded information from the recording medium can be carried out in the same manner as that conventionally used in the read-out of the information. In detail, a laser beam for reproducing information is irradiated on the recording layer side or the substrate side of the medium to measure light reflectance of the reflected light. On the basis of the difference of the reflectance between the opaque area and the transparent area of the recording layer, the recorded information can be reproduced. When the reflecting layer is provided on the surface of the recording layer, the difference of the light reflectance becomes more prominent to enhance the S/N ratio for reproduction. On the contrary, when the reflecting layer is not provided on the recording layer, transmittance of the transmitted light of the laser beam is measured. On the basis of the difference of the transmittance, the recorded information can be reproduced.

Erasing of information can be performed in the following manner. Using the same semiconductor laser as described above, a laser beam is irradiated on only the phase-altered area of the recording layer (e.g., opaque part in the case of the LCST type polymer blend) or the whole area of the recording layer. Under irradiation, the light-absorbing material on the irradiated area of the recording layer absorbs the light energy and generates a heat. Owing to the generated heat, the polymer blend existing in the vicinity of the light-absorbing material is heated to have a temperature of above the cloud point. Heating of the polymer blend in the erasing procedure can be also done by directly applying a heat energy to the polymer blend using a heat source such as an infrared rays heater as described hereinbefore.

Subsequently, the recording medium is gradually or slooly cooled. In this cooling procedure, as the temperature of the polymer blend becomes lower than the cloud point, the phase condition of the polymer blend alters from the phase-separated state to the homogeneous state and thus returns to the original transparent state at room temperature. Accordingly, whole of the recording layer becomes transparent, and the recorded information can be erased. The light employed for erasing information may have a lower power than the light for recording information, provided that the light makes the temperature of the polymer blend not lower than the cloud point.

Figure 8:
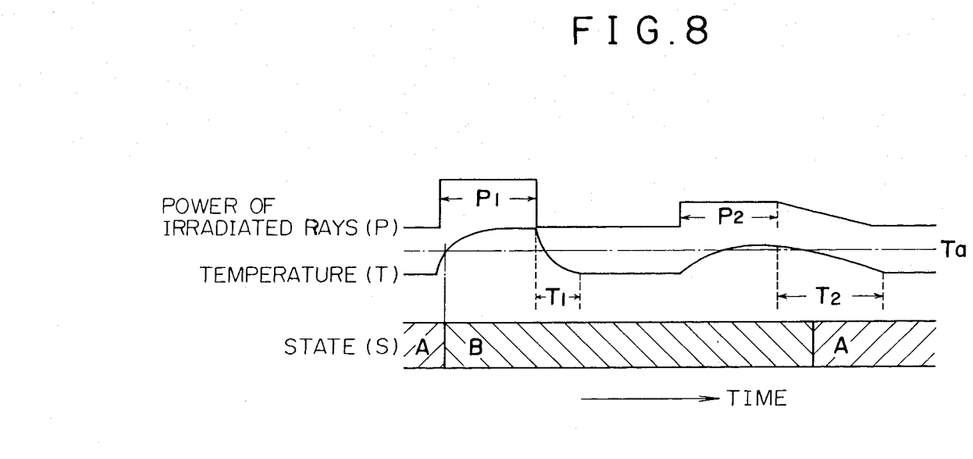
FIG. 8 is a graph showing an alteration of phase condition with time in the recording procedure of information and the erasing procedure of information.

FIG. 8 schematically shows change or alteration of phase condition of the polymer blend in the recording and erasing information, in which time is plotted on the abscissa.

FIG. 8, a graph P (shown on the top) indicates a variation of the light power irradiated on the polymer blend, and portions of $P_1$ and $P_2$ correspond to recording of information and erasing of information, respectively. A graph T shows a change of temperature of the polymer blend, and portions of $T_1$ and $T_2$ correspond to rapid cooling and gradual cooling, respectively. Point Ta is a cloud point of the employed polymer blend. In any case of the recording procedure and the erasing procedure, the temperature of the polymer blend is temporarily elevated to not lower than the cloud point. A graph S (shown on the bottom in FIG. 8) illustrates a change or an alteration of phase condition of the polymer blend, in which condition A shows un-recorded condition (i.e., transparent homogeneous state in the case of the LCST type polymer blend, while opaque and phase-separated state in the case of the UCST type polymer blend), and condition B shows recorded condition (i.e., opaque phase-separated state in the case of the LCST type polymer blend, while transparent homogeneous state in the case of the UCST type polymer blend).

It should be understood that the information recording medium employed for the process of recording and erasing information of the invention is by no means restricted to the aforementioned structures, and any structure can be applied, as far as the recording medium contains at least a polymer blend and a light-absorbing material, and the light-absorbing material is brought into contact with the polymer blend. For example, it is possible to incorporate the light-absorbing material into the substrate not into the recording layer.

The examples and the comparison example of the present invention are given below.

EXAMPLE 1

To a toluene solution of a LCST type polymer blend comprising a combination of polystyrene and polyvinyl methyl ether was added a dichloroethane solution of a cyanine dye having the following formula (i.e., the aforementioned formula (5)):

They were well mixed to prepare a coating solution. The ratio between the polymer blend and the cyanine dye in the coating solution was 100:10 (polymer blend:cyanine dye), by weight.

The coating solution was coated over a disc-shaped substrate of cell-cast acrylic resin having been provided with a tracking guide (outer diameter: 130 mm, inner diameter: 15 mm, thickness: 1.2 mm, track pitch: 1.6 $\mu$m) by means of spin coating, and the coated layer is dried to form a recording layer having dry thickness of 0.1 $\mu$m on the substrate.

Thus, an information recording medium comprising a substrate and a recording layer as shown in FIG. 1 was prepared.

The obtained recording medium was then irradiated with a semiconductor laser beam (wavelength: 830 nm, light power: 10 mW, beam diameter: 1.6 $\mu$m) to write information on the medium. Then the medium was irradiated with a semiconductor laser beam (wavelength: 830 nm, light power: 0.6 mW, beam diameter: 1.6 $\mu$m) to read out the information. As a result, information of binary values was read out.

EXAMPLE 2

The procedure of Example 1 was repeated except for using a dimethylacetamide solution of a LCST type polymer blend comprising a combination of polyvinylidene fluoride and polymethyl methacrylate, to prepare an information recording medium comprising a substrate and a recording layer.

The obtained recording medium was subjected to the writing procedure of information and the read-out procedure of information in the same manner as described in Example 1. As a result, information of binary values was read out.

COMPARISON EXAMPLE 1

The procedure of Example 2 was repeated except for not using the light-absorbing material (cyanine dye) to prepare an information recording medium comprising a substrate and a recording layer.

The obtained recording medium was subjected to the writing procedure of information and the read-out procedure of information in the same manner as described in Example 1. However, information of binary values was not obtained.

EXAMPLE 3

The procedure of Example 1 was repeated except for using a LCST type polymer blend comprising a combination of polyvinylidene fluoride and polymethyl methacrylate to form a recording layer on the substrate of cell-cast acrylic resin having been provided with a tracking guide. Then aluminum was vacuum-deposited on the recording layer to form a reflecting layer having thickness of 1,000 angstroms on the recording layer.

Subsequently, a polyester film was laminated on the reflecting layer using an adhesive to form a protective layer having thickness of 100 $\mu$m.

Figure 3:
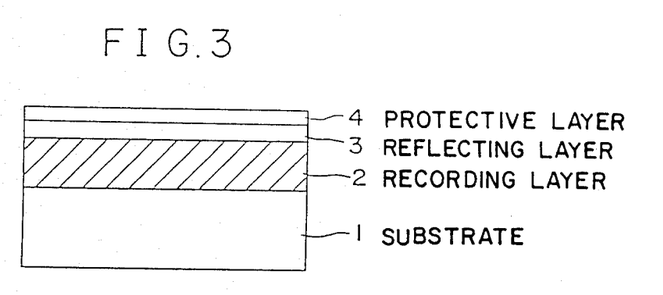

Thus, an information recording medium comprising a substrate, a recording layer, a reflecting layer and a protective layer, superposed in this order, as shown in FIG. 3, was prepared.

The obtained recording medium was subjected to the writing procedure of information and the read-out procedure of information in the same manner as described in Example 1. As a result, information of binary values with high S/N ratio was read out.

EXAMPLE 4

A dichloroethane solution of a cyanine dye having the aforementioned formula in Example 1.

The above-obtained solution was coated over a disc-shaped substrate of cell-cast acrylic resin having been provided with a tracking guide (outer diameter: 130 mm, inner diameter: 15 mm, thickness: 1.2 mm, track pitch: 1.6 $\mu$m) by means of spin coating, and the coated layer is dried to form a light-absorbing layer having dry thickness of 0.1 $\mu$m on the substrate.

Subsequently, a toluene solution of a LCST type polymer blend comprising a combination of polystyrene and polyvinyl methyl ether was coated by means of spin coating, and the coated layer is dried to form a recording layer having dry thickness of 0.1 μm on the light-absorbing layer.

Thus, an information recording medium comprising a substrate, a light-absorbing layer and a recording layer as shown in FIG. 4 was prepared.

The obtained recording medium was then irradiated with a semiconductor laser beam (wavelength: 830 nm, light power: 10 mW, beam diameter: 1.6 μm) to write information on the medium. Then the medium was irradiated with a semiconductor laser beam (wavelength: 830 nm, light power: 0.6 mW, beam diameter: 1.6 μm) to read out the information. As a result, information of binary values was read out.

EXAMPLE 5

The procedure of Example 4 was repeated except for using a dimethylacetamide solution of a LCST type polymer blend comprising a combination of polyvinylidene fluoride and polymethyl methacrylate, to prepare an information recording medium comprising a substrate, a light-absorbing layer and a recording layer.

The obtained recording medium was subjected to the writing procedure of information and the read-out procedure of information in the same manner as described in Example 4. As a result, information of binary values was read out.

COMPARISON EXAMPLE 2

The procedure of Example 5 was repeated except for not forming the light-absorbing layer to prepare an information recording medium comprising a substrate and a recording layer.

The obtained recording medium was subjected to the writing procedure of information and the read-out procedure of information in the same manner as described in Example 4. However, information of binary values was not obtained.

EXAMPLE 8

The procedure of Example 4 was repeated except for using a LCST type polymer blend comprising a combination of polyvinylidene fluoride and polymethyl methacrylate to form a recording layer on the light-absorbing layer formed on a substrate of cell-cast acrylic resin having been provided with a tracking guide. Then aluminum was vacuum-deposited on the recording layer to form a reflecting layer having thickness of 1,000 angstroms on the recording layer.

Subsequently, a polyester film was laminated on the reflecting layer using an adhesive to form a protective layer having thickness of 100 μm.

Thus, an information recording medium comprising a substrate, a light-absorbing layer, a recording layer, a reflecting layer and a protective layer, superposed in this order, as shown in FIG. 6, was prepared.

The obtained recording medium was subjected to the writing procedure of information and the read-out procedure of information in the same manner as described in Example 4. As a result, information of binary values with high S/N ratio was read out.

What is claimed is:

1. A method of recording information comprising the steps of:

irradiating a light-absorbing dye with a laser beam for causing said light-absorbing dye to absorb energy of the beam and generate a heat, said light-absorbing dye being arranged in contact with a polymer blend which changes in its phase condition between a homogeneous state and a phase-separated state in response to change of its temperature across its cloud point, whereby elevating the temperature of said polymer blend in the vicinity of said light-absorbing dye to a temperature of not lower than the cloud point of the polymer blend to change its phase condition into a state which is different from the original state before the elevation of the temperature; and rapidly cooling the polymer blend to fix the polymer blend in its changed phase condition.

2. The method of recording information as claimed in claim 1, wherein said polymer blend is a polymer blend of lower critical solution temperature type which is fixed in the phase-separated state by the rapid cooling.

3. The method of recording information as claimed in claim 1, wherein said polymer blend is a polymer blend of upper critical solution temperature type which is fixed in the homogeneous state by the rapid cooling.

4. The method of recording information as claimed in claim 1, wherein said light-absorbing dye shows a high absorption ability for light in the near infrared region of 700-900 nm.

5. An information recording medium comprising a substrate and a recording layer which is provided on one surface or both surfaces of the substrate and comprises a light-absorbing dye and a polymer blend which changes in its phase condition between a homogeneous state and a phase-separated state in response to change of its temperature across its cloud point.

6. The information recording medium as claimed in claim 5, wherein said polymer blend has a cloud point between the homogeneous state and the phase-separated state in the range of from 60° to 400° C.

7. The information recording medium as claimed in claim 5, wherein said polymer blend is a polymer blend of lower critical solution temperature type.

8. The information recording medium as claimed in claim 5, wherein said polymer blend is a polymer blend of upper critical solution temperature type.

9. The information recording medium as claimed in claim 5, wherein said light-absorbing dye shows a high absorption ability for light in the near infrared region of 700-900 nm.

10. The information recording medium as claimed in claim 5, wherein the recording layer is provided with a reflecting metal layer on the surface facing the substrate or the opposite surface thereof.

11. The information recording medium as claimed in claim 5, wherein the recording layer is provided with a protective layer on the surface not facing the substrate.

12. The information recording medium as claimed in claim 5, wherein the recording layer is provided with a reflecting metal layer and a protective film in this order on the surface not facing the substrate.

13. The information recording medium as claimed in claim 5, wherein the substrate is provided with a pregroove on the surface facing the recording layer.

14. An information recording medium comprising a substrate, a recording layer which is provided on one surface or both surfaces of the substrate and comprises a polymer blend which changes in its phase condition between a homogeneous state and a phase-separated state in response to change of its temperature across its cloud point, and a light-absorbing layer which is arranged in contact with the recording layer and comprises a light-absorbing dye.

15. The information recording medium as claimed in claim 14, wherein said polymer blend has a cloud point between the homogeneous state and the phase-separated state in the range of from 60° to 400° C.

16. The information recording medium as claimed in claim 14, wherein said polymer blend is a polymer blend of lower critical solution temperature type.

17. The information recording medium as claimed in claim 14, wherein said polymer blend is a polymer blend of upper critical solution temperature type.

18. The information recording medium as claimed in claim 14, wherein said light-absorbing dye shows a high absorption ability for light in the near infrared region of 700–900 nm.

19. The information recording medium as claimed in claim 14, wherein the substrate is provided with a pre-groove on the surface facing the recording layer.

* * * * *